(12) United States Patent
Hu

(10) Patent No.: US 8,081,400 B1
(45) Date of Patent: Dec. 20, 2011

(54) SLIDER WITH AN AIR-BEARING SURFACE INCLUDING FOUR PRESSURE GENERATING POCKETS FOR COUNTERING DISRUPTIVE MOVEMENT

(75) Inventor: Yong Hu, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 632 days.

(21) Appl. No.: 12/201,916

(22) Filed: Aug. 29, 2008

(51) Int. Cl.
*G11B 5/60* (2006.01)

(52) U.S. Cl. ..................... 360/236.3; 360/237

(58) Field of Classification Search ............... 360/236.3, 360/237
See application file for complete search history.

(56) References Cited

U.S. PATENT DOCUMENTS

| | | | |
|---|---|---|---|
| 5,353,180 A | 10/1994 | Murray | |
| 5,568,981 A | 10/1996 | Nepela et al. | |
| 5,583,722 A | 12/1996 | Dorius et al. | |
| 5,587,858 A | 12/1996 | Dorius et al. | |
| 5,870,250 A | 2/1999 | Bolasna et al. | |
| 5,917,679 A | 6/1999 | Park et al. | |
| 6,021,020 A | 2/2000 | Itoh et al. | |
| 6,072,662 A | 6/2000 | Utsunomiya | |
| 6,212,032 B1 | 4/2001 | Park et al. | |
| 6,490,135 B1 | 12/2002 | Sannino et al. | |
| 6,504,682 B1 | 1/2003 | Sannino et al. | |
| 6,515,831 B1 | 2/2003 | Sannino et al. | |
| 6,594,113 B2 | 7/2003 | Rao et al. | |
| 6,606,222 B1 | 8/2003 | Ryun | |
| 6,661,612 B1 | 12/2003 | Peng | |
| 6,678,119 B1 | 1/2004 | Pendray et al. | |
| 6,747,847 B2 | 6/2004 | Stoebe et al. | |
| 6,980,399 B2 | 12/2005 | Rajakumar et al. | |
| 7,019,945 B1 | 3/2006 | Peng et al. | |
| 7,106,556 B2 | 9/2006 | Pendray et al. | |
| 7,245,455 B2 * | 7/2007 | Rajakumar ............... 360/235.8 | |
| 7,262,937 B2 * | 8/2007 | Pendray et al. ............ 360/235.1 | |
| 7,593,188 B2 * | 9/2009 | Ruiz .............................. 360/128 | |
| 7,719,795 B2 * | 5/2010 | Hu et al. .................... 360/235.7 | |
| 2002/0071216 A1 | 6/2002 | Sannino et al. | |
| 2005/0280943 A1 | 12/2005 | Inoue et al. | |
| 2007/0025023 A1 | 2/2007 | Kohira et al. | |
| 2008/0024924 A1 | 1/2008 | Bolasna et al. | |

* cited by examiner

*Primary Examiner* — Allen Heinz

(57) ABSTRACT

A slider with an air-bearing surface includes an ID-side leading pad, an OD-side leading pad, an ID-side trailing pad, and an OD-side trailing pad. Each leading and trailing pad includes a respective pocket extending from the respective pad toward the air-bearing surface. The pockets each include a respective step surface surrounded by a trailing-side wall, an ID-side wall, and an OD-side wall. Each step surface has a respective depth, and each pocket is open to a leading side of the pocket. The slider further includes at least one cavity between the leading and trailing pads. The cavity includes a bottom surface of the slider having a cavity depth greater than all of the respective depths of the step surfaces of the pockets.

14 Claims, 3 Drawing Sheets

SLIDER WITH AN AIR-BEARING SURFACE INCLUDING FOUR PRESSURE GENERATING POCKETS FOR COUNTERING DISRUPTIVE MOVEMENT

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

The typical hard disk drive includes a head disk assembly (HDA) and a printed circuit board (PCB) attached to a disk drive base of the HDA. Referring now to FIG. 1, the head disk assembly 100 includes at least one disk 102 (such as a magnetic disk, magneto-optical disk, or optical disk), a spindle motor 104 for rotating the disk, and a head stack assembly (HSA) 106. The spindle motor typically includes a rotating hub on which disks are mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor and for controlling the position of the HSA, and for providing a data transfer channel between the disk drive and its host. The head stack assembly 106 typically includes an actuator, at least one head gimbal assembly (HGA) 108 that includes a head, and a flex cable assembly 110.

During operation of the disk drive, the actuator must rotate to position the heads adjacent desired information tracks on the disk. The actuator includes a pivot bearing cartridge 112 to facilitate such rotational positioning. One or more actuator arms extend from the actuator body. An actuator coil 114 is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk drive is not in use.

In a magnetic hard disk drive, the head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive. During operation of the magnetic hard disk drive 100, the transducer is typically supported in very close proximity to the magnetic disk 102 by a hydrodynamic air bearing. As the motor 104 rotates the magnetic disk 102, the hydrodynamic air bearing is formed between an air bearing surface of the slider of the head, and a surface of the magnetic disk 102. When the disk drive 100 is powered down, the HSA 106 rotates clockwise until a load tab of HGA 108 contacts a ramp 116 thereby lifting the slider from the surface of disk 102 before the disk 102 stops rotating. The thickness of the air bearing at the location of the transducer is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

The flying height is a key parameter that affects the performance of an information storage device. Accordingly, the nominal flying height is typically chosen as a careful compromise between each extreme in a classic engineering "trade-off." If the flying height is too high, the ability of the transducer to write and/or read information to/from the disk surface is degraded. Therefore, reductions in flying height can facilitate desirable increases in the areal density of data stored on a disk surface. However, the air bearing between the slider and the disk surface cannot be eliminated entirely because the air bearing serves to reduce friction and wear (between the slider and the disk surface) to an acceptable level. Excessive reduction in the nominal flying height degrades the tribological performance of the disk drive to the point where the disk drive's lifetime and reliability become unacceptable. Moreover, if the slider roll angle becomes excessive, then the air bearing may become even thinner at a corner of the slider than at the location of the transducer, potentially further degrading tribological performance.

One difficulty that can be particularly troublesome for hard disk drives used in mobile computers is operational shock, frequently referred to by the abbreviated name "op shock." When the disk drive is subject to a mechanical disturbance, such as when a notebook computer is moved suddenly, the air bearing between the slider and the disk surface may be temporarily lost, which can result in contact or collisions between the slider and the disk surface that can damage the head or the disk. In addition to the immediate harm to the head or the disk, such contact can also generate particles within the disk drive with the possibility of degrading drive functionality further by contributing to thermal asperities, disk scratches, and other undesirable operational events.

SUMMARY

A slider with an air-bearing surface includes an ID-side leading pad, an OD-side leading pad, an ID-side trailing pad, and an OD-side trailing pad. Each leading and trailing pad includes a respective pocket extending from the respective pad toward the air-bearing surface. The pockets each include a respective step surface surrounded by a trailing-side wall, an ID-side wall, and an OD-side wall. Each step surface has a respective depth, and each pocket is open to a leading side of the pocket. The slider further includes at least one cavity between the leading and trailing pads. The cavity includes a bottom surface of the slider having a cavity depth greater than all of the respective depths of the step surfaces of the pockets.

DETAILED DESCRIPTION OF THE PREFERRED EMBODIMENTS

Figure 1:
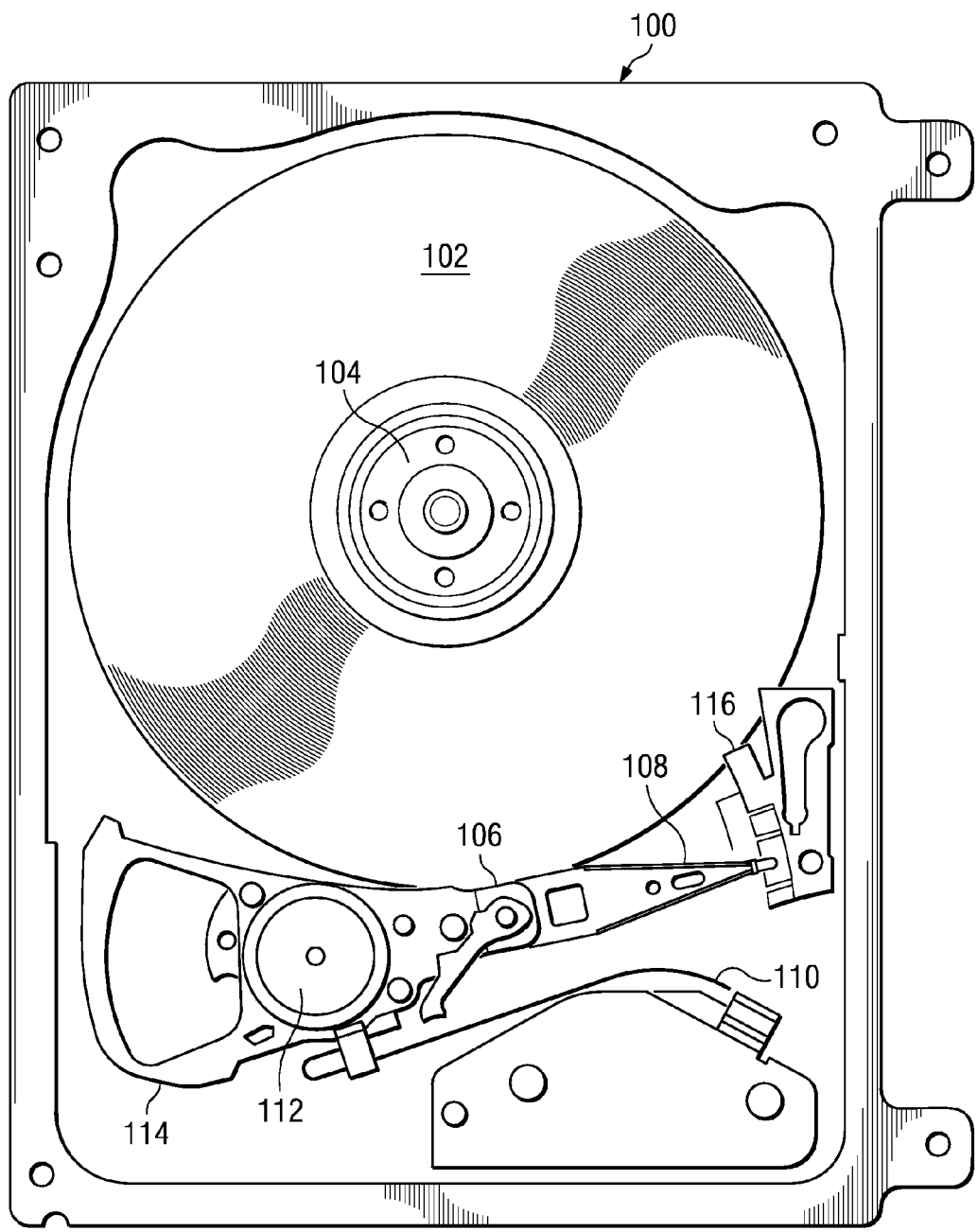
FIG. 1 illustrates a disk drive usable with a slider according to various embodiments of the particular invention.
Figure 2:
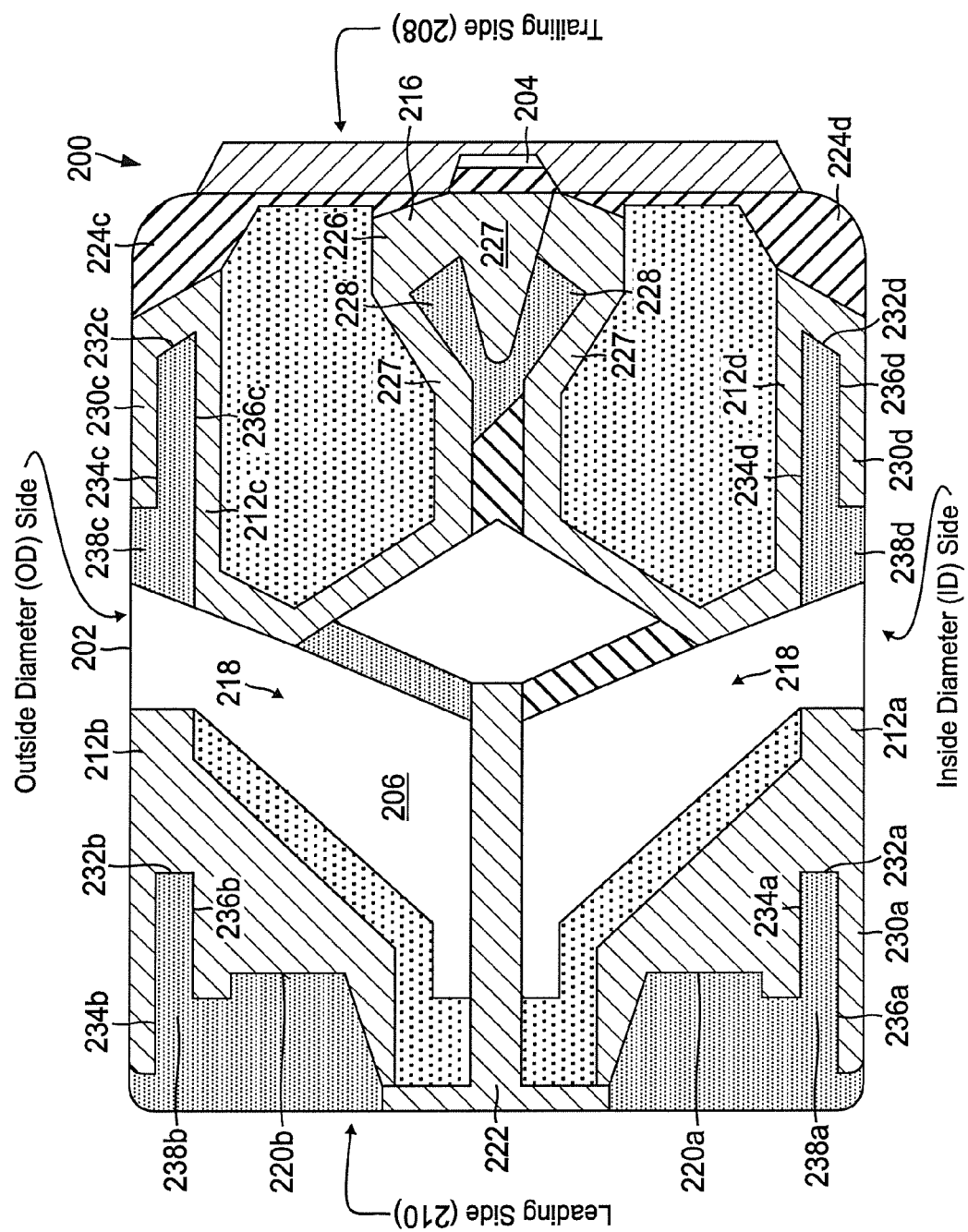
FIG. 2 illustrates an air bearing surface of a slider according to a particular embodiment of the invention.
Figure 3:
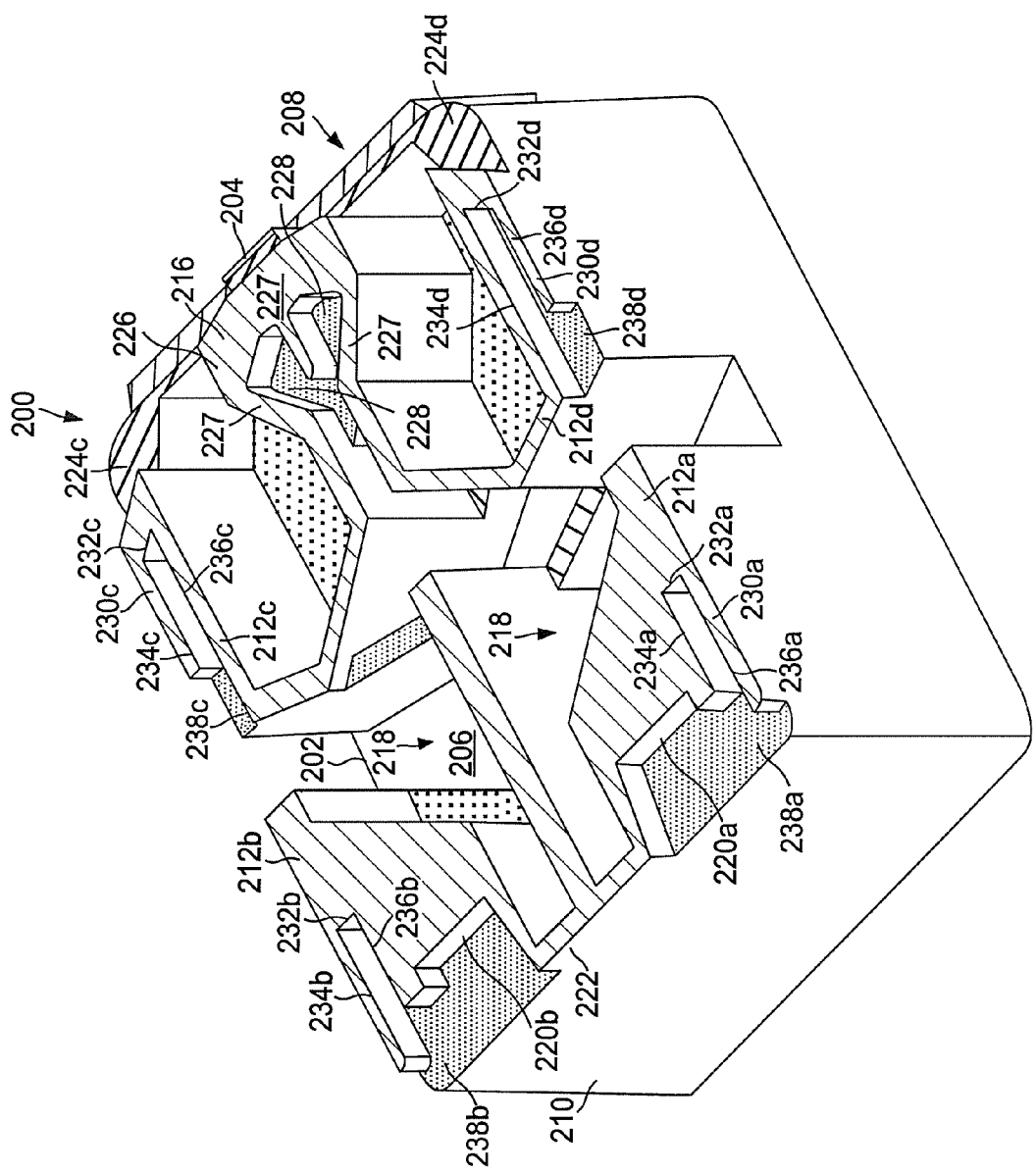
FIG. 3 illustrates a perspective view of the air bearing surface of the slider of FIG. 2 according to a particular embodiment of the invention.

FIG. 2 and FIG. 3 illustrate a head 200 comprising a slider 202 that includes a transducer 204 for reading information from a magnetic disk medium. In certain embodiments, the transducer 204 is a merged thin film magnetic transducer comprising an inductive writer and magneto resistive read element. In such embodiments, the magneto resistive element may be a giant magneto resistive element (GMR) or a tunneling magneto resistive element (TMR). In such embodiments, the writer may be a perpendicular magnetic recording (PMR) writer.

The slider 202, which is typically fabricated from a ceramic material such as alumina titanium carbide (AlTiC). The slider 202 includes an air bearing surface 206, which may be formed on the surface of slider 202 by etching or ion milling and has a geometry that may be defined by use of a mask. The slider 202 includes a trailing face 208 and a leading face 210, and the slider 202 may be covered by an overcoat (not shown), which is typically formed from diamond-like carbon (DLC), to protect the slider 202 and the transducer 204 from particles and objects that can damage the slider 202.

In describing the slider 202, the terms "leading" (or "forward") and "trailing" (or "aft") are directions corresponding to the respective orientation of the ends of the slider 202 as the slider 202 would fly on the air bearing over the magnetic disk medium. Thus, as the magnetic disk rotates under the slider 202, the leading end of the slider 202 would fly over a particular point on the magnetic disk before the trailing end. Similarly, the term "upstream" is used herein only to define a directional convention to facilitate description of relative positions on the air bearing surface 206, and does not require the presence or existence of any stream. For example, "upstream" can be understood to refer to a range of directions across the air bearing surface 206 that generally point away from the trailing face 208 and towards the leading face 210, with "downstream" being the antonym of "upstream" in this sense. As such, in disk drive applications, upstream directions would ultimately be generally opposite the motion of an adjacent rotating disk surface. Similarly, structures on the slider 202 may be described as "inner diameter (ID)-side" or "outer diameter (OD)-side" when the structure being described is nearer to the side of the slider that would be closest or farthest (respectively) from the center of the disk when the slider 202 is positioned over the disk.

In the illustrated embodiment, the slider 202 includes multiple pads having surfaces that are not recessed, which is to say that these surfaces are the surfaces of the slider 202 closest to the magnetic disk medium when the slider 202 is positioned to fly over the magnetic disk medium. These surfaces define a reference plane for the air bearing surface 206, often referred to as a primary plane of the slider 202. Other surfaces of the slider 202 are recessed from the primary plane, using techniques such as etching or ion milling as described above, to form step surfaces having a depth from the primary plane of the slider 202 by which those step surfaces are recessed. Thus, the "depth" of a step should be understood to refer to the relative depth to which a particular surface is recessed from the nearest surface in the primary plane. This is also the sense in which the terms "shallower" and "deeper" may be understood to refer to the relative depth of step surfaces; a structure with a shallower surface thus extends from the deeper surface toward the air bearing surface 206 of the slider 202. The deepest surface of the air bearing surface 206 is herein referred to as the "bottom surface" of the slider 202.

In the illustrated embodiment of FIG. 2 and FIG. 3, the slider 202 includes two leading pads (212a, 212b), two trailing pads (212c, 212d), and a trailing center pad 216 surrounding a central cavity 218. The central cavity has a cavity depth such that the bottom of the cavity is located at a bottom surface of the slider's air bearing surface 206. In a particular embodiment, the cavity depth is between 0.8 and 1.6 microns. Each leading pad (212a, 212b) includes a leading-edge step (220a, 220b), and the leading pads (212a, 212b) are connected by a leading-edge dam 222. The illustrated trailing pads (212c, 212d) include leading steps (238c, 238d) and trailing pressurizing steps (224c, 224d). The trailing center pad 216 includes an aft region 226 from which three projections 227 extend toward the central cavity 218. Between the three projections 227 are two inter-projection step surfaces 228, each inter-projection step surface having a respective inter-projection step depth. When the slider 202 is flying over a magnetic disk medium, the combination of features described helps to maintain an air bearing between the slider 202 and the disk as described above. In particular, the described features may help to maintain pitch stability, referring to the prevention of an incline in the forward or aft direction, and roll stability, referring to the prevention of an incline in the ID-side or OD-side direction.

On each of the leading pads (212a, 212b) and trailing pads (212c, 212d) is a respective pocket (230a, 230b, 230c, 230d). The pockets (230a, 230b, 230c, 230d) each include a respective trailing side wall (232a, 232b, 232c, 232d), ID-side wall (234a, 234b, 234c, 234d), and OD-side wall (236a, 236b, 236c, 236d) surrounding a respective step surface (238a or first step surface, 238b or second step surface, 238c or third step surface, 238d or fourth step surface) that defines the bottom of the pocket (230a, 230b, 230c, 230d). Each pocket (230a, 230b, 230c, 230d) is open at a leading side of the pocket (230a, 230b, 230c, 230d). The depth of each step surface (238a, 238b, 238c, 238d) is less than the cavity depth of the central cavity 218.

During operation of the slider 202, the pockets (230a, 230b, 230c, 230d) may improve pitch and roll stability and may prevent the slider 202 from contacting the disk as follows. When the slider 202 is subject to a sudden mechanical disturbance, such as operational shock, the slider 202 may lose its air bearing, and the slider 202 may also be driven toward the disk surface. This may produce pitch or roll of the slider 202 as well. As the slider 202 approaches the disk, pressure will rapidly develop within the pockets (230a, 230b, 230c, 230d) as compared with the surrounding surfaces. The sudden increase in pressure within the pockets (230a, 230b, 230c, 230d) tends to push the slider 202 away from the disk, thus slowing the approach of the slider 202 and allowing more time for the air bearing to be reestablished. Moreover, the position of the pockets (230a, 230b, 230c, 230d) near the corners of the slider 202 allows the pressure buildup to help in correcting pitch or roll in the slider 202, since the pressure will increase more rapidly at the corners closest to the disk. Consequently, the pressure will tend to counterbalance whatever pitch and/or roll was produced by the mechanical disturbance.

The relative depth of the step surfaces (238a, 238b, 238c, 238d) as compared to other features of the slider 202 may be suitably selected based on a number of considerations. For example, if the depth of the step surfaces (238a, 238b, 238c, 238d) is selected to be equal to the depth of another surface, such as the depth of the leading-edge steps (220a, 220b) or the inter-projection step surfaces 228, fabrication of the slider may be simplified by forming the step surfaces (238a, 238b, 238c, 238d) and the leading-edge steps (220a, 220b) in a single etching or milling process. In another example, the depth of the step surfaces (238a, 238b, 238c, 238d) might be selected to produce additional pitch or roll in a certain direction, such as when the slider 202 has a tendency to incline in the opposite direction when the air bearing is lost. In another similar example, the depth of the step surfaces (238a, 238b, 238c, 238d) on the trailing pads (212c, 212d) may be selected advantageously to be greater than or equal to a pressurizing step depth of the leading and/or trailing pressurizing steps (224c, 224d) of the trailing pads (212c, 212d). In various embodiments with a cavity depth around 0.8 to 1.6 microns, the depth of the step surfaces (238a, 238b, 238c, 238d) may preferably range from around 0.05 to 0.6 microns. It should be understood, however, that the particular depths of the step surfaces (238a, 238b, 238c, 238d) may vary from slider to slider and, in a particular slider, from one another based on considerations including but not limited to ease of fabrication, improvement of slider performances. Accordingly, the particular depths and their relation to the depths of other structures should be seen as exemplary and not restrictive.

More generally, in the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

What is claimed is:

1. A slider having an air-bearing surface, comprising:
    an ID-side leading pad proximate to an ID-side leading corner of the slider;
    an OD-side leading pad proximate to an OD-side leading corner of the slider;
    an ID-side trailing pad proximate to an ID-side trailing corner of the slider;
    an OD-side trailing pad proximate to an OD-side trailing corner of the slider;
    an ID-side leading pocket extending from the air-bearing surface toward the ID-side leading pad, the ID-side leading pocket comprising a first step surface surrounded by a first trailing-side wall, a first ID-side wall, a first OD-side wall, and an open leading side, the first step surface having a first depth;
    an OD-side leading pocket extending from the air-bearing surface toward the OD-side leading pad, the OD-side leading pocket comprising a second step surface surrounded by a second trailing-side wall, a second ID-side wall, a second OD-side wall, and an open leading side, the second step surface having a second depth;
    an ID-side trailing pocket extending from the air-bearing surface toward the ID-side trailing pad, the ID-side trailing pocket comprising a third step surface surrounded by a third trailing-side wall, a third ID-side wall, a third OD-side wall, and an open leading side, the third step surface having a third depth;
    an OD-side trailing pocket extending from the air-bearing surface toward the OD-side trailing pad, the OD-side trailing pocket comprising a fourth step surface surrounded by a fourth trailing-side wall, a fourth ID-side wall, and a fourth OD-side wall, and an open leading side, the fourth step surface having a fourth depth; and
    at least one cavity between the ID-side leading pad, the OD-side leading pad, the ID-side trailing pad, and the OD-side trailing pad, the at least one cavity including a bottom surface of the slider having a cavity depth greater than the first depth, the second depth, the third depth, and the fourth depth.

2. The slider of claim 1, further comprising a trailing center pad between the ID-side trailing pad and the OD-side trailing pad, the trailing center pad comprising an aft region and three projections extending from the aft region toward the at least one cavity, the three projections including a central projection, an ID-side projection, and an OD-side projection.

3. The slider of claim 2, wherein the ID-side projection is contiguous with the third OD-side wall of the ID-side trailing pocket.

4. The slider of claim 2, wherein the ID-side projection is contiguous with the fourth ID-side wall of the OD-side trailing pocket.

5. The slider of claim 2, further comprising two inter-projection step surfaces respectively between the ID-side projection and the central projection and the OD-side projection and the central projection, each inter-projection step surface having a respective inter-projection step depth.

6. The slider of claim 5, wherein the inter-projection depth is equal to at least one of the third depth and the fourth depth.

7. The slider of claim 1, wherein the ID-side leading pad comprises an ID-side leading step having a first leading step depth and the OD-side leading pad comprises an OD-side leading step having a second leading step depth.

8. The slider of claim 7, wherein the first leading step depth equals the first depth and the second leading step depth equals the second depth.

9. The slider of claim 1, wherein the first depth, the second depth, the third depth, and the fourth depth are equal.

10. The slider of claim 1, further comprising a leading dam connecting the ID-side leading pad and the OD-side leading pad.

11. The slider of claim 1, wherein all of the first depth, the second depth, the third depth and the fourth depth are between 0.05 microns and 0.6 microns.

12. The slider of claim 1, wherein the cavity depth is between 0.8 microns and 1.6 microns.

13. The slider of claim 1, wherein the cavity depth is less than 3 microns.

14. The slider of claim 1, wherein the slider is a component of a disk drive configured to store information using the slider and a magnetic disk media.

* * * * *